I. BULLARD.
Vegetable Cutter.
No. 77,250.
Patented April 28, 1868.
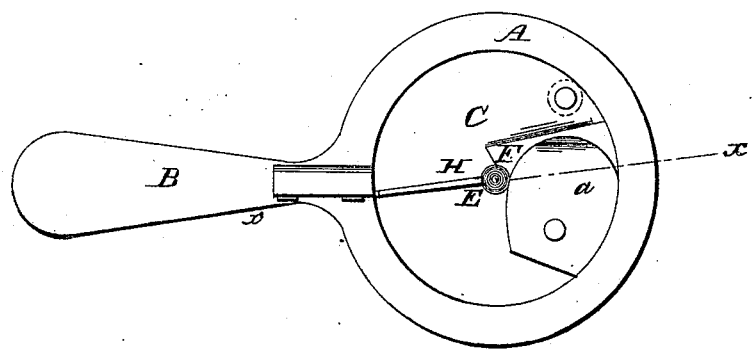
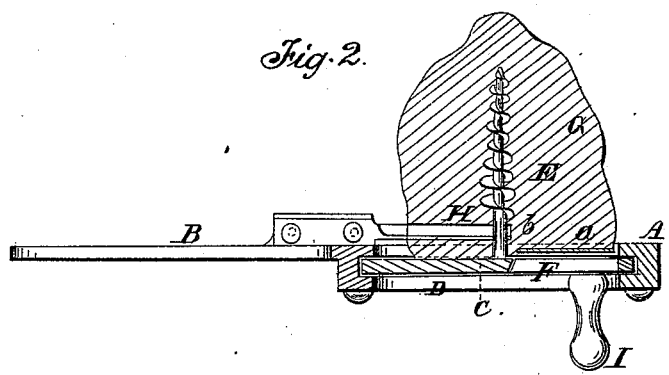
Witnesses:
Inventor:
Isaac Bullard
Per Munn & Co
Attys

United States Patent Office.

ISAAC BULLARD, OF DEDHAM, MASSACHUSETTS.

Letters Patent No. 77,250, dated April 28, 1868.

IMPROVED VEGETABLE-SLICER.

*The Schedule referred to in these Letters Patent and making part of the same.*

TO ALL WHOM IT MAY CONCERN:

Be it known that I, ISAAC BULLARD, of Dedham, (Readville post office,) in the county of Norfolk, and State of Massachusetts, have invented a new and improved Vegetable-Slicer; and I do hereby declare that the following is a full, clear, and exact description thereof, which will enable those skilled in the art to make and use the same, reference being had to the accompanying drawings, forming part of this specification, in which—

Figure 1 is a plan view of my invention.
Figure 2 is a section of the same, through the line $x\ x$ of fig. 1.
Similar letters of reference indicate corresponding parts.

The nature of this invention relates to the slicing of vegetables, as potatoes and the like, and consists of a revolving disk bearing a screw-point and a cutter, together with other devices contributing to the perfect operation of the machine, whereby potatoes and other vegetables similar in texture are sliced in a rapid and effective manner, by merely turning a crank, as will hereinafter be duly set forth.

In the accompanying plate of drawings, the grooved rim A having a handle, B, supports the revolving disk C, by means of the rim-plate D, which completes the groove in which the disk fits with easy contact, as shown at fig. 2.

The disk C is formed with an opening, F, at the edge of which is riveted, or otherwise affixed, a cutter-plate, $a$, the cutting-edge of which projects somewhat over the opening F.

The cutting-plate is slightly deflected from the plane of the surface of the disk, in order that its cutting-edge may encounter the vegetable, G, held on the screw-point E, which latter projects from the centre of the disk, and at right angles with the plane of the same, as shown.

In order that the vegetable held on the screw-point shall not turn with the disk, a knife-edge, H, of sheet metal, is provided, which is affixed in any suitable way to some point on the rim A, as that shown.

The end of the knife-edge may rest against the cylindrical part of the screw-point, as shown at $b$, or it may be bent so as to clasp the said part loosely.

The office of this edge is to hold the vegetable from turning, and also to sever the slices, for without this device, (supposing the vegetable were held in any other manner,) the vegetable would be shaved in a continuous helical slice or shaving, which would require an additional operation to divide it into smaller portions.

The crank-handle I is affixed to the disk, as shown, and thus completes an invention which is useful in the slicing of fruit as well as potatoes, or other garden vegetables, as aforesaid.

In operating this machine, the screw-point is merely struck into the vegetable, or the same pushed on the said point, the screwing on of the same not being necessary, and when the disk is rotated, the screw-thread operates to draw the potato against the knife-edge and cutter continuously.

I desire to be understood as not confining myself to the screw-point, as a plain cylindrical point will answer, as the deflected edge of the cutter will serve to draw the vegetable up to it at each revolution, although the operation in this particular is not so perfect. Neither do I wish to be limited to the employment of a knife-edge for the purpose of holding the vegetable from turning, as a curved fork or point may be substituted to accomplish the same object, or several cutting-projections may be affixed to the rim for the said purpose, but I have set forth what I consider to be the simplest form of the invention.

In practice the disk, rim, and handle are made of cast iron, and galvanized to prevent corrosion.

This invention is simple, cheap, and efficient, and has been practically proven to be a desirable household utensil.

I claim as new, and desire to secure by Letters Patent—

The disk C, with an opening, F, and cutting-plate $a$, in combination with the rim A and plate D, and the point E and knife-edge H, all substantially as and for the purpose shown and described.

ISAAC BULLARD.

Witnesses:
DAVID L. DAVIS,
E. P. DAVIS.